Nov. 16, 1937.  L. BUSCH  2,099,646

ROLL CARRIER FOR PHOTOGRAPHIC STRIP FILM

Filed July 17, 1935

INVENTOR:
Leo Busch,
BY U. M. Pevius.
D. H. Stewart.
ATTORNEYS.

Patented Nov. 16, 1937

2,099,646

UNITED STATES PATENT OFFICE 2,099,646

ROLL CARRIER FOR PHOTOGRAPHIC STRIP FILM

Leo Busch, Berlin-Karlshorst, Germany

Application July 17, 1935, Serial No. 31,841
In Germany October 24, 1934

5 Claims. (Cl. 242—71)

This invention relates to roll carriers for photographic strip film, that is to say spools or reels of the kind comprising a flanged hub having an aperture in one or each end to cooperate with supply and take-up supports within the camera, or magazines for motion picture film and of the reversible type containing a reel or core upon which the virgin film is originally wound and having apertures in its ends one of which registers with an opening in the magazine wall through which a driving connection can be established with a take-up support in the camera.

When a roll film cartridge or a reel carrying a motion picture film has been placed in the camera and the film has passed therethrough for exposure, the empty original spool or reel is usually removed from the camera, reversed end for end and placed in engagement with the take-up support or supports in readiness for again winding film thereon. Similarly, in the case of a reversible magazine for use in recording two rows of images side by side on a motion picture film, when one half of the width of the film has been exposed the magazine has to be removed from the camera and reversed before replacing the magazine in the camera so that the original reel or core cooperates with the take-up support in a position which is reversed end for end relatively to that which the reel occupied on the supply support.

When the roll carrier has been removed from the camera difficulty may arise in determining whether the film has or has not passed through the camera so that there is a risk of the film being exposed a second time and thus spoiled. The present invention has for its object to overcome this difficulty.

To this end a roll carrier according to the present invention is furnished with a frangible seal which will remain unbroken unless and until the film on the hub has passed through the camera and the hub is positioned for take-up purposes. In this way when a film has been wound from the original spool during exposure of the film, the seal associated with the spool upon which the exposed film is wound will have been broken so that clear indication will be given that the film carried by the spool has passed through the camera.

Figure 1:
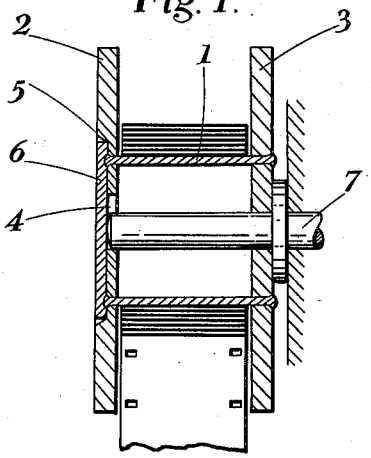
Figure 3:
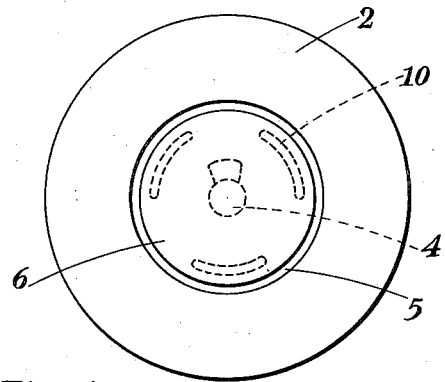
Figure 2:
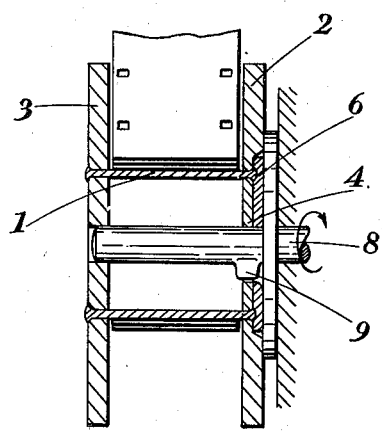
Figure 4:
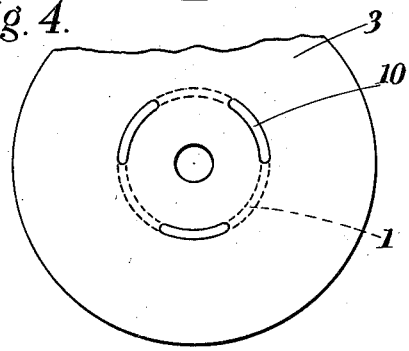
Figure 5:
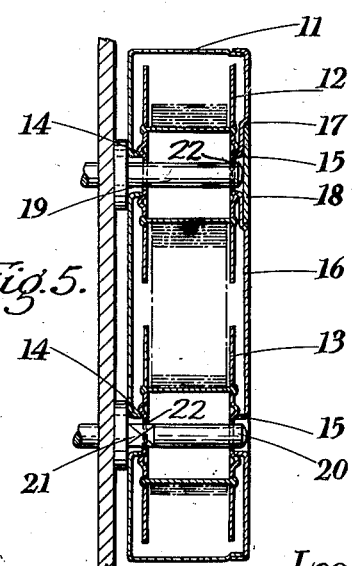

Two constructions according to the invention are illustrated by way of example in the accompanying drawing, in which Figure 1 is a vertical section through a metallic reel when this is in position on a supply support within a motion picture camera, Figure 2 is a similar view of the reel when arranged on the take-up support, Figure 3 illustrates the reel in elevation from that end carrying the frangible seal, Figure 4 shows the reel in elevation from that end remote from the frangible seal, and Figure 5 is a section of a reversible magazine embodying the invention.

Figure 6:
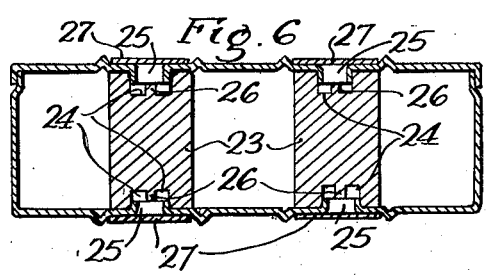

Figure 6 is a longitudinal section through a magazine constructed in accordance with still another embodiment of my invention.

In the construction illustrated in Figures 1 to 4 the reel comprises a hub 1 furnished with two flanges 2 and 3, the flange 2 having a keyhole aperture 4 whilst the flange 3 has a central circular aperture. The hub 1 is secured to the flanges 2 and 3 by tongues, 10. The outer face of the flange 2 is dished or recessed as indicated at 5 and a disc 6 of frangible material such, for example, as paper, metal foil or transparent material which is readily perforated, is secured to the flange so as to lie in this recess.

The length of the supply support or spindle 7 is such that when the reel is placed thereon as shown in Figure 1, the end of the spindle 7 lies clear of and thus does not damage the seal 6. The film can then be wound from the reel on to a take-up reel, the film being thus exposed in the camera. If now the original reel is removed from the supply spindle 7 and reversed end for end and placed on the take-up support or spindle 8, the spindle pierces the seal 6 as shown in Figure 2. A key 9 on the spindle 8 now engages the eccentric portion of the aperture 4 and the reel serves as the take-up reel for the next film to be passed through the camera. When the reel carrying the exposed film is removed from the take-up spindle 8, the broken seal will clearly indicate that the film carried by this reel has been passed through the camera. Thus, by examining the reel itself it will be clear that the film carried thereby has been exposed.

The seal 6 may be secured to the flange 2 in any suitable manner as by means of adhesive. If desired instructions may be printed on one flange or on the seal 6, warning the user against destruction of the seal otherwise than by insertion of the reel on the take-up support 8, and to avoid premature destruction of the seal by placing the reel on the supply spindle 7 with the flange 2 inwards.

The invention may be applied also to spools for roll film cartridges provided that the supply chamber within the camera is not furnished with a support which will pierce the seal, so that the latter will be broken only by the winding mechanism such, for example, as the clutch of the winding key. The invention may also be applied to reversible magazines for motion picture film and whereby two rows of images are recorded on the film with the images of one row inverted relatively to those in the other row.

One construction of magazine embodying the invention is illustrated in Figure 5 in which a casing 11 contains two reels 12 and 13 each of which can rotate on hollow bosses 14 and 15 so that the apertures in the ends of each hub register with the openings through the said bosses. The cover 16 of the magazine has a depression or recess 17 at that part surrounding the boss 15 associated with the reel 12 upon which the virgin film is originally wound, and a frangible seal 18 is secured in this recess so as to cover the opening in the said boss 15. The magazine is first placed in the camera with the reel 12 on a supply spindle 19 and the reel 13 on a take-up spindle 20 driven by the camera. The reel 12 is free to rotate on the spindle 19 whose length is such that it will not damage the seal 18. A squared portion 21 of the take-up spindle 20 however engages a correspondingly shaped driving aperture in one end of the hub of the reel 13 which is thus driven to wind the film from the reel 12, one half of the width of the film being thus exposed in the camera. After the first traverse of the film through the camera the magazine is removed and inverted and reversed and replaced so that the supply spindle 19 passes through the annular bosses 15 and 14 associated with the reel 13, whereas the take-up spindle passes through the seal 18 and bosses 15 and 14 associated with the reel 12. The squared portion 21 of the take-up spindle 20 now engages the correspondingly shaped aperture 22 at one end of the reel 12 which now serves as the take-up reel during the second traverse of the film through the camera to record the second row of images. Reel 13 has one opening 22 which is likewise of a square shape to receive the squared end 21 of the take-up spindle.

After reversal from left to right and end for end and reinsertion of the magazine therefore the seal 18 will have been broken so that when the magazine has again been removed from the camera, i. e. when the whole width of the film has been exposed, the broken seal will clearly indicate that the film within the magazine has been exposed and that the magazine must not be reinserted in the camera. With a view to preventing premature destruction of the seal 18 there may be printed on the magazine or on the seal itself instructions indicating that the magazine must in the first instance be inserted in the camera with the cover 16 lying outermost.

Referring to Figure 6, a film carrier in the form of a magazine is here illustrated with a readily frangible seal fastened over an aperture in each side of the magazine. In accordance with this showing, the carrier supports films on a pair of similar hub members 23 which may be wooden blocks having apertures 24 in each side. Each hub member carries a flange 26 in one of the apertures, these being arranged on opposite sides of the magazine and being adapted to form a driving connection with a winding member of known type carried by a camera. The hub members 23 are mounted to rotate upon the inwardly extending annular flanges 25 which are parts of the casing, and which with hubs 23 form a light-tight connection.

The hub members 23 thus have axially arranged openings spaced apart and over that opening carrying the driving flange 26, I preferably attach a readily frangible seal 27, one on each side of the casing. Thus, when the driving connection has been made with either flange, the seal is broken so that an operator, by glancing at the outside of the magazine, can readily determine how the magazine has been previously used in his camera.

It will be appreciated that the constructions above described are given by way of example only and that details may be modified. For example, the invention is not only applicable to metal reels as described and illustrated but may also be applied to spools or reels of the kind comprising a wooden core with or without flanges.

What I claim as my invention and desire to secure by Letters Patent is:—

1. In a reversible magazine for motion picture film and which is placed first in one position within the camera for exposure of one half of the width of the film and is then removed and reversed before being replaced in the reverse position for exposure of the other half of the width of the film, in combination, a casing, at least one hub mounted within the casing with an opening at each end of the hub registering with an aperture in the adjacent wall of the casing, and two frangible seals one extending over each of the said apertures, one of the said seals remaining unbroken until the magazine is placed in its first position in the camera whilst the other seal remains unbroken until the magazine, after the first passage of the film through the camera, has been removed and replaced in the reversed position in the camera.

2. In a roll carrier for photographic film, the combination with a carrier for photographic strip film including apertures on both sides spaced a predetermined distance, of a spindle adapted to enter either aperture but of insufficient length to project through both apertures, a frangible seal covering at least one aperture, whereby the condition of the seal may indicate the direction in which the carrier has been placed on said shaft.

3. In a roll carrier for photographic film, the combination with a carrier for photographic strip film including at least one pair of coaxially arranged apertures spaced a predetermined distance, of a spindle adapted to engage but not to pass through both coaxially arranged apertures, a frangible seal over at least one of said apertures to indicate the direction the carrier has been placed on said shaft.

4. In a roll carrier for photographic film, the combination with a carrier for photographic strip film including a container, two pairs of coaxially arranged apertures carried thereby, each pair being spaced the same predetermined distance apart, a shaft adapted to engage a coaxially arranged pair of apertures but of insufficient length to extend therethrough, a frangible seal over one of each pair of apertures whereby the direction in which the carrier has been placed on said shaft may be determined.

5. In a roll carrier for photographic film, the combination with a carrier for photographic strip film including a container, two pairs of coaxially arranged apertures carried thereby, each pair being spaced the same predetermined distance apart, a shaft adapted to engage a coaxially arranged pair of apertures but of insufficient length to extend therethrough, a frangible seal over one of each pair of apertures, said seals being disposed on opposite sides of said carrier whereby the direction in which the carrier has been placed on said shaft may be determined.

LEO BUSCH.